UNITED STATES PATENT OFFICE 2,339,454

ASSAY CRUCIBLE AND SIMILAR ARTICLE

Richard S. Bradley, Mexico, Mo., assignor to A. P. Green Fire Brick Company, Mexico, Mo., a corporation of Missouri No Drawing. Application December 30, 1940, Serial No. 372,349

2 Claims. (Cl. 106—68)

Assay crucibles, melting crucibles, roasting dishes, scorifiers and like articles should be capable of withstanding sudden temperature changes without cracking and should be highly resistant to slagging action; and it is the object of the present invention to produce articles of this kind with the desirable properties mentioned.

According to the present invention, plastic fire clay is used as the base material. To this base material is added finely ground fused silica. The mixture is tempered with approximately twelve to fourteen per cent of water to the consistency of relatively stiff mud, that is, to a consistency between what is generally recognized as suitable for dry press molding and the consistency generally recognized as suitable for stiff mud molding. The mixture is formed or molded in suitable molds into assay crucibles, melting crucibles, roasting dishes, scorifiers and like articles. The green vessels or articles thus formed are then dried and fired at approximately 2300° Fahrenheit.

The properties of articles thus produced are determined by what is known as the "assaying test." This test consists in charging a crucible with about 100 grams of a mixture consisting of 30 grams of litharge, 30 grams of borax, 35 grams of soda ash, and 5 grams of flour; then putting the crucible in a furnace heated to about 2100° Fahrenheit and keeping it there for about thirty minutes; then removing the crucible from the furnace, emptying the molten slag from the crucible, and letting the crucible cool for thirty minutes. The crucible is then charged with a new batch of 100 grams of the litharge-borax-soda ash-flour mixture, again put in the furnace for the time and at the temperature mentioned and again removed, emptied and cooled. This procedure is repeated until the crucible cracks or until the slag eats through the wall of the crucible, and any spalling is noted. The merits of the mixture of which the crucible is made are determined by the number of times the crucible can undergo the treatment specified before its wall is cracked or eaten through or fails by spalling.

By this so-called "assaying test," it was found that the addition of finely ground fused silica to plastic fire clay definitely improves the resistance of the vessel or other article to sudden temperature changes even when used in relatively small percentages. The addition of ground fused silica to plastic fire clay at the rate of ten per cent silica to ninety per cent fire clay gives excellent results in preventing loss of the articles by cracking under sudden temperature change. In fact, it was found that even five per cent of ground fused silica produced ware that was much more resistant to cracking an account of temperature changes than similar ware without such ground fused silica. On the other hand, when ground fused silica is added in quantities in excess of twenty per cent, the ability of the ware to resist slag action is distinctly decreased. When the composition ranges between five percent and fifteen per cent of ground fused silica and eighty-five to ninety-five per cent of plastic fire clay, the ware is resistant to cracking and also resistant to slag action; whereas a smaller amount of ground fused silica brings about a notable increase in cracking of the ware and the use of more than fifteen per cent of ground fused silica involves a definite increase in slagging action. In this connection, it may be noted that the use of silica sand, ground silica rock, quartzite, ganister and the like, as distinguished from ground fused silica, makes the articles more sensitive to temperature changes and reduces the resistance to slagging. In their natural condition, silica sand, silica rock, quartzite and the silica of ganister are crystalline, whereas fused silica is vitreous and breaks with a conchoidal fracture. Accordingly the term "vitreous silica" as used in the appended claims is intended to have the same meaning as the term "fused silica" hereinbefore used.

What I claim is:

1. A refractory crucible or similar refractory article composed of between eighty-five and ninety-five per cent of plastic fire clay and of between five and fifteen per cent of ground vitreous silica.

2. A crucible or similar refractory article composed of plastic fire clay and ground vitreous silica in the proportion of from about five to fifteen per cent of ground vitreous silica to from eighty-five to ninety-five per cent of plastic fire clay.

RICHARD S. BRADLEY.